3,007,055
TEST SIGNAL GENERATOR WITH CIRCUIT MEANS TO SEPARATELY ADJUST RISE AND FALL TIME OF THE OUTPUT PULSES
Fred Herzfeld, Princeton, N.J., assignor to Radio Corporation of America, a corporation of Delaware
Filed July 21, 1960, Ser. No. 44,322
9 Claims. (Cl. 307—88.5)

RECTANGULAR
Fig. 3.
SAWTOOTH
Fig. 4.
TRAPEZOID
Fig. 5.
TRAPEZOID
Fig. 8.
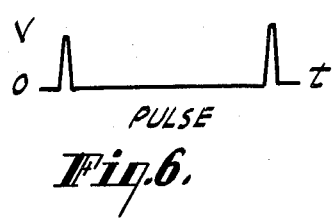
PULSE
Fig. 6.
SAWTOOTH
Fig. 9.
TRIANGULAR
Fig. 7.
INVENTOR.
Fred Herzfeld United States Patent Office 3,007,055
Patented Oct. 31, 1961

This invention relates generally to generators of test signals, and more particularly to improved apparatus for generating a variety of voltage waveforms over a range of frequencies. The test signal generator of the present invention is particularly useful in testing the response of equipment and circuits that are gated "on" and "off," for example, by the leading and trailing edges, respectively, of a test signal. The test signal generator of the present invention is also useful in the research laboratory for generating a variety of voltage waveforms for testing new equipment and circuits.

Heretofore, test signals of a desired waveform and frequency were provided by a plurality of independent circuits, usually one circuit for each waveform desired. Thus, for example, three independent circuits would be used to generate a sawtooth wave, a trapezoidal wave and a square wave. Such an arrangement resulted in the necessity for maintaining a large variety of bulky equipment at a relatively high cost.

Accordingly, it is an object of the present invention to provide an improved test signal generator for generating a wide variety of voltage waveforms by the same circuit means.

Another object of the present invention is to provide an improved test signal generator for generating a trapezoidal wave whose rise-time, plateau-time, decay-time and frequency are independently adjustable over a relatively wide range.

A further object of the present invention is to provide an improved test signal generator for generating a wide variety of electrical test signals by means of apparatus that is relatively simple in structure, very reliable in operation, and highly efficient in use.

In accordance with the present invention, the improved test signal generator comprises circuit means to which is applied an asymmetrical square wave generated by a flip-flop circuit that is controlled by two delay circuits. The square wave is applied to a linear ramp generator circuit for gating it "on" and "off" periodically. The linear ramp generator circuit is adapted to generate a trapezoidal wave whose rise-time is adjustable and whose decay-time is substantially instantaneous. The output of the linear ramp generator circuit is applied to the input of a special circuit having a capacitor that is connected in a manner to follow a monotonic, non-decreasing input voltage and to generate a linear decreasing ramp of an adjustable rate of decay when the input voltage decays at a faster rate than the adjustable decay rate. The plateau-time, that is, the time between the leading and trailing edges of the trapezoidal wave, may be varied from zero to any desired time by varying the duration of the excursions of one polarity of the aforementioned asymmetrical square wave. Hence, a trapezoidal wave whose rise-time and decay-time are adjustable and whose plateau-time is zero may be converted to a sawtooth wave, a triangular wave or a pulse, as desired. The quiescent time between test signals is determined by the excursions of the opposite polarity of the asymmetrical square wave, thereby determining the frequency of the test signals. Means are also provided to produce a single test signal as well as signals of a predetermined frequency.

The novel features of the present invention, both as to its organization and methods of operation, as well as additional objects and advantages thereof, will be more readily understood from the following description, when read in connection with the accompanying drawings, in which:

FIGS. 3, 4, 5, 6, 7, 8 and 9 are examples of waveforms of test signals that can be produced by the apparatus of FIG. 1.

Figure 1:
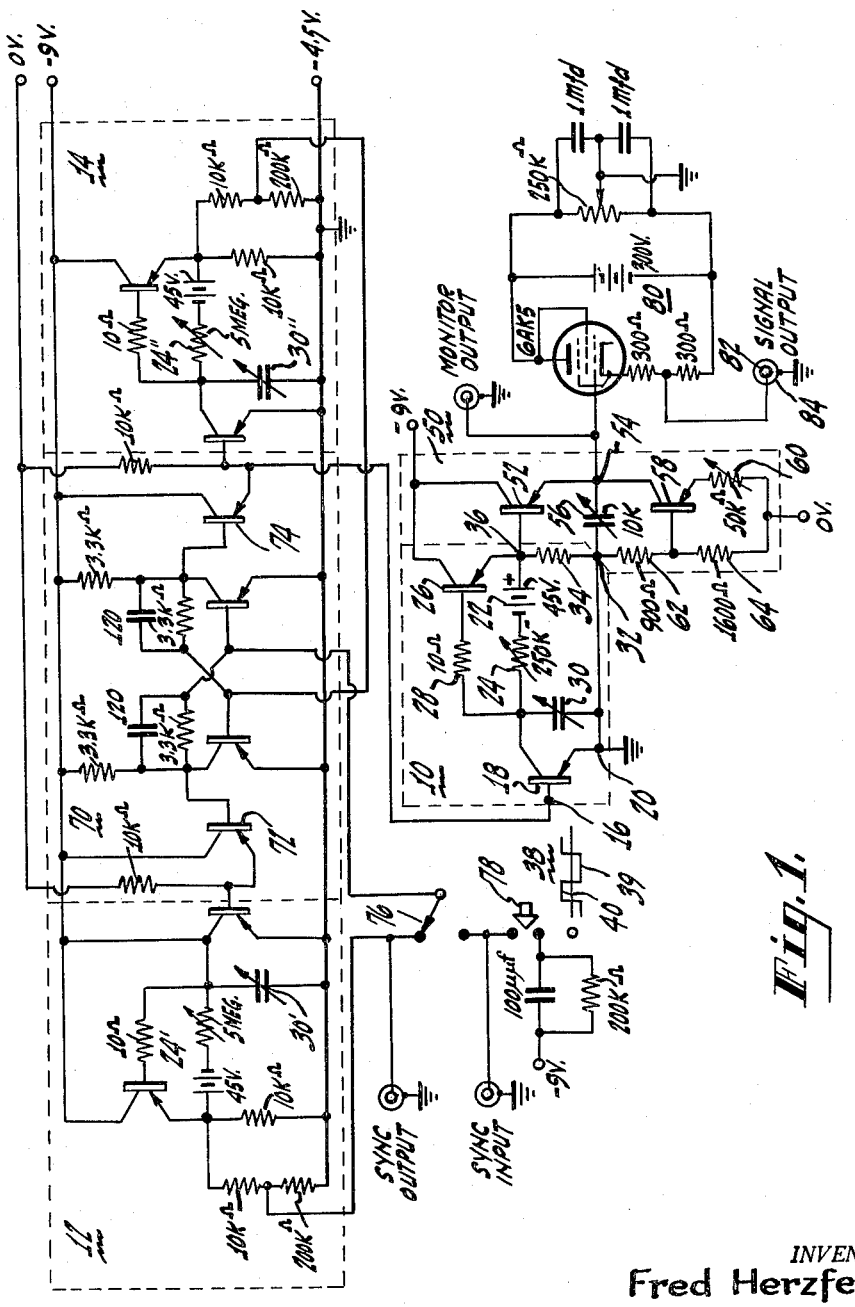
FIG. 1 is a schematic diagram of apparatus for generating a variety of electrical test signals in accordance with the present invention.

Referring, now, particularly to FIG. 1, there is shown the circuitry of a test signal generator adapted to provide at its output a trapezodial waveform whose rise-time, plateau-time, decay-time and frequency may be varied independently. The circuitry of the test generator comprises three substantially similar linear ramp generator circuits 10, 12 and 14, each enclosed within a dashed rectangle. Since the operation of each of the generator circuits 10, 12 and 14 is the same, only the operation of the generator circuit 10 will be explained in detail.

The generator circuit 10 has an input terminal 16 connected to the base of a PNP transistor 18 and an input terminal 20 connected to the emitter of the transistor 18. The input terminal 20 is connected to a common connection, such as ground. The collector of the transistor 18 is connected to the negative terminal of a voltage source 22 through a variable resistor 24. The collector of the transistor 18 is also connected to the base of a transistor 26 through a resistor 28. A variable capacitor 30 is connected between the collector and the emitter of the transistor 18. The emitter of the transistor 26 is connected directly to the positive terminal of the voltage source 22 and to a grounded output terminal 32 through a resistor 34. The emitter of the transistor 26 is also connected to the output terminal 36. The collector of the transistor 26 is connected to a source of a negative voltage, as indicated.

In operation, the linear ramp generator circuit 10 is adapted to be gated "on" and "off" by an alternating voltage, such as a square wave 38. The transistor 18 of the generator circuit 10 comprises a switch which substantially short circuits the capacitor 30 when the transistor is conducting, as when a negative-going excursion 39 of the square wave 38 is applied to the base of the transistor 18. Thus, a negative-going pulse may be said to gate the generator circuit 10 "off." The generator circuit 10 is gated "on" when a positive-going excursion 40 of the square wave 38 applied at terminal 16 cuts off conduction through the transistor 18. When the transistor 18 is non-conductive, the voltage source 22 charges the capacitor 30. The charge on the capacitor 30 is applied to the base of the transistor 26, which, in turn, causes the transistor 26 to conduct and to provide a voltage across the resistor 34 that is equal to the voltage across the capacitor 30. This results from the fact that the resistor 34 is connected to the transistor 26 in an emitter-follower circuit.

Figure 2:
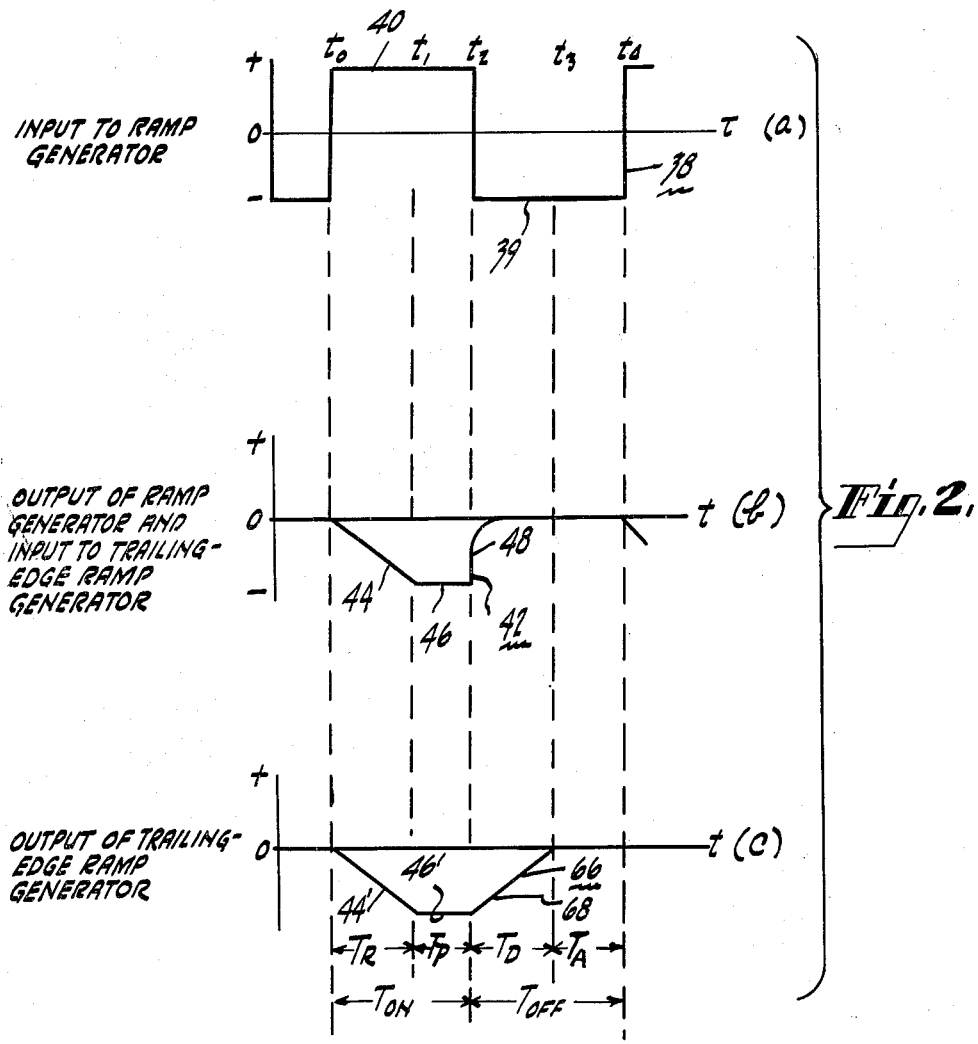
FIG. 2 illustrates waveforms used to explain the operation of the test signal generator of FIG. 1.

Referring, now, to FIGS. 2a and 2b, it is apparent that a positive-going excursion of a square wave 38 applied to the generator circuit 10 causes the latter to be gated "on" and to provide at its output a trapezoidal wave 42. The rise-time, that is, the slope of leading edge 44 of the waveform 42, is controlled by the time constant of the variable capacitor 30 and the variable resistor 24. After the capacitor 30 is charged, the plateau 46 of the trapezoidal wave 42 is formed. The duration of the rise-time and the plateau-time is determined by the duration ($t_2-t_0$) of the positive-going excursion of the asymmetrical square wave 38, where $t_0$ and $t_2$ represent the time of the beginning and the end, respectively, of the positive-going excursion. It will be noted that if the time ($t_2-t_1$) were reduced to zero, the plateau 46 would be eliminated from the trapezoidal wave 42 and the output of the ramp generator 10 would be a sawtooth wave. The time $t_1$ represents the end of the leading edge 44. When the capacitor 30 is discharged at the time of the negative-going excursion 39 of the square wave 38, the trailing edge 48 of the trapezoidal wave 42 decays substantially instantaneously.

The output terminals 36 and 32 of the generator circuit 10 are also the input terminals of a special circuit 50, shown enclosed within a dashed rectangle. The special circuit 50 adjusts the trailing edge of the trapezoidal output wave 42 from the generator circuit 10 to a predetermined slope. The circuit 50 includes a transistor 52 to the base of which the terminal 36 of the circuit 10 is connected. The collector of the transistor 52 is connected to the collector of the transistor 26. The emitter of the transistor 52 is connected directly to an output terminal 54 and also to the grounded terminal 32 through a variable capacitor 56. The grounded terminal 32 is also an output terminal of the circuit 50. The capacitor 56 may be considered a capacitive load in the emitter circuit of the transistor 52, the transistor 52 being connected in an emitter-follower circuit. With this arrangement, the charge on the capacitor 56 will follow any input signal to the circuit 50 monotonically.

Means are provided to discharge the capacitor 56 at a predetermined, desired rate when the input to the circuit 50 decreases faster than the predetermined, desired rate. To this end, the capacitor 56 is provided with substantially linear discharge means. This discharge means includes a transistor 58 whose collector is connected to the output terminal 54 and whose emitter is connected to a source of relatively positive voltage (not shown) through a variable resistor 60. The grounded terminal 32 is connected to the last-mentioned source of voltage through a pair of serially connected resistors 62 and 64. The common junction of the resistors 62 and 64 is connected to the base of the transistor 58 to provide the latter with a source of fixed bias whereby to cause the current flow through the transistor 58 to be substantially constant.

The operation of the special circuit 50 will now be explained: A monotonic, non-decreasing potential at the input of the circuit 50 is reproduced across the capacitor 56. When the input signal decays rapidly to zero, as by the trailing edge 48 of the voltage wave 42, conduction through the transistor 52 is cut off and the capacitor 56 stops charging. The capacitor 56 will then discharge linearly through the transistor 58 for the period $T_D$ ($t_3-t_2$), until the potential across the capacitor 56 is substantially zero. At this point, quiescent conditions begin for the period $T_A$ ($t_4-t_3$).

The slope of the trailing edge 48, that is, the decay-time of the waveform 42, may be changed by adjusting the time constant determined by the variable resistor 60 and the variable capacitor 56, or by varying the bias on the transistor 58. Thus, the trapezoidal waveform 42 at the input to the circuit 50 may be converted to the waveform 66 (FIG. 2c at the output of the circuit 50. The leading edge 44' and plateau 46' of the waveform 66 is substantially the same as the leading edge 44 and plateau 46 of the waveform 42. The slope of the trailing edge 68 of the waveform 66, however, may be adjusted by controlling the discharge rate of the capacitor 56, that is, by varying the time constant determined by the variable resistor 60 and the variable capacitor 56. The condition for linearity of the trailing edge 68 of the output wave 66 is that the trailing edge of the input to the circuit 50 should decay fast enough to keep the transistor 52 cut off whereby the capacitor 56 may discharge. Since a square wave is adapted to drive the linear ramp generator circuit 10, and the output of this circuit 10 is applied to the input of the circuit 50, the resultant output of the circuit 50 is a generalized trapezoid waveform, as shown in FIG. 2c. If the square wave 38 for gating the generator circuit 10 "on" and "off" is made asymmetrical, for example, as by reducing the time $T_{ON}$ to $T_R$, the plateau-time, $T_P$, is reduced to zero, and the output wave 66 becomes triangular.

A conventional, bistable flip-flop circuit 70 is provided to produce either a symmetrical or an asymmetrical square wave output, as desired. The circuits 12 and 14 are used herein as delay circuits and are connected to the inputs of the flip-flop circuit 70 to control the positive-going and negative-going excursions of the square-wave output. By varying the time constant of the variable capacitor 30' and variable resistor 24' in the delay circuit 12, the delay of the negative-going excursion 39 of the square wave 38 can be adjusted. This time is indicated as $T_{OFF}$ ($t_4-t_2$), in FIG. 2. In a similar manner, by varying the time constant of the variable capacitor 30'' and the variable resistor 24'' in the delay circuit 14, the positive-going excursion 40 of the square wave 38 can be adjusted. This time is indicated as $T_{ON}$ ($t_2-t_0$), in FIG. 2.

The flip-flop circuit 70 is a bistable multivibrator of the basic Eccles-Jordan type whose detailed operation is explained in "Basic Theory and Application of Transistors," pages 202–204, TM11–690, Department of The Army Technical Manual, March 1959. Transistors 72 and 74 in the circuit 70 are connected as emitter followers and function to decouple the delay circuits 12 and 14, respectively, from the basic flip-flop circuit. The square-wave output of the flip-flop circuit 70 is obtained from the emitter of the decoupling transistor 74 and is applied to the input terminal 16 of the linear ramp generator circuit 10 to gate the latter "on" and "off."

The flip-flop circuit 70 has provisions for either a sync output or a sync input through a single pole-double throw switch 76. In the "sync output" position of the switch 76, the flip-flop circuit 70 provides output pulses for synchronizing an oscilloscope (not shown) in a manner well-known in the art. In the "sync input" position of the switch 76, the flip-flop circuit 70 can be triggered by external sync pulses in a manner also well known in the art. A normally open push-button switch 78 is provided to trigger the flip-flop circuit 70 for one cycle by substituting a single, unidirectional pulse for the delay circuit 12, when the switch 76 is in the "sync input" position.

The trapezoidal output wave from the special circuit 50 may be applied to an oscilloscope (not shown) through "monitor output" terminals connected in parallel with the output terminals 54 and 32. The output of special circuit 50 may drive a power amplifier circuit 80, of conventional design well known in the art, to provide an amplified signal at signal output terminals 82 and 84, if so desired.

From the foregoing description, it will be apparent that there has been provided an improved test signal generator adapted to provide at its output signals of a generalized trapezoidal waveform whose rise-time, plateau-time, decay-time and quiescent time are independently adjustable. An asymmetrical square wave is generated by a flip-flop circuit that is controlled by two variable delay circuits. The asymmetrical square wave is adapted to gate a linear ramp generator circuit providing a rising leading edge. This, in turn, drives a special circuit. The latter special circuit follows input signals monotonically and provides a decreasing linear ramp or trailing edge of a predetermined, desired decay-time when the input decays faster than the rate of linear decay determined by the special circuit.

In an embodiment of the present invention using the values of the components indicated in FIG. 1, signals having the waveforms shown in FIGS. 3, 4, 5, 6, 7, 8 and 9 have been obtained. Rectangular signals, as shown in FIG. 3, are obtained by making the rise-time and decay-time of a generalized trapezoidal waveform as short as possible. Sawtooth signals, as shown in FIG. 4, are obtained by making the plateau-time and the decay-time of the generalized trapezoidal waveform substantially zero. Trapezoidal signals of different waveforms, as shown in FIGS. 5 and 8, are obtained by varying independently the rise-time, plateau-time, decay-time and quiescent-time of the generalized trapezoidal waveforms. A series of pulses, as shown in FIG. 6, is obtained by making the plateau-time substantially zero and by making the rise-time and decay-time relatively short. By making the plateau-time zero and by making the rise-time and decay-time substantially equal, triangular signals, as shown in FIG. 7, are obtained. Sawtooth signals, as shown in FIG. 9, are obtained by making the rise-time and the plateau-time substantially zero.

In this embodiment, the minimum rise-time and decay-time was approximately 2.5 microseconds, and the maximum rise-time and decay-time was in the neighborhood of 3 seconds. It will be understood, however, that the values of the components given herein are illustrative and are not to be considered in a limiting sense. The slopes of the leading edge and the trailing edge of the output signals were controlled by time constants determined in the ramp generator circuit and in the special circuit, respectively. The plateau-time and the frequency (quiescent-time) were varied by the duration of the excursions of opposite polarity of an asymmetrical square wave. Also, by coupling a unidirectional pulse producing circuit instead of a delay circuit to the flip-flop circuit, an output signal waveform of a single cycle was produced.

What is claimed is:

1. Means for generating a variety of signal waveforms comprising first circuit means to generate a first signal waveform having leading and trailing edges of a predetermined voltage amplitude, said first circuit means comprising means to adjust the slope of said leading edge, second circuit means, and means to apply said first signal waveform to said second circuit means, said second circuit means comprising means to adjust the slope of said trailing edge to a predetermined slope when said slope of said trailing edge of said first signal waveform is steeper than said predetermined slope whereby to convert said first signal waveform to a second signal waveform the slopes of whose leading and trailing edges are independently variable.

2. Means for generating a variety of signal waveforms as set forth in claim 1 comprising, in addition, variable means connected to said first circuit means to gate said first circuit means "on" for a predetermined period to vary the distance between said leading and trailing edges.

3. Means for generating a variety of signal waveforms as set forth in claim 1 wherein said means connected to said first circuit means comprise, in addition, variable means to gate said first circuit means "on" and "off" for predetermined periods to vary the distance between said leading and trailing edges and to control the frequency of repetition of said signal waveforms.

4. Apparatus comprising a first circuit having an input and an output, a second circuit having an input and an output, said first circuit comprising means to generate in response to signals applied to its input a first voltage waveform having leading and trailing edges at said output of said first circuit, said first circuit also comprising means to adjust the rise-time of said leading edge to vary its slope and means to cause said trailing edge to have a substantially instantaneous decay-time, means connecting said input of said second circuit to said output of said first circuit, a capacitor in said second circuit connected to be charged monotonically by said first voltage waveform, said second circuit comprising adjustable means to discharge said capacitor linearly at a predetermined rate when said trailing edge of said first voltage waveform decays at a faster rate than said predetermined rate, and means connecting said capacitor in common with said output of said second circuit whereby to obtain a second voltage waveform at said output of said second circuit the slopes of whose leading and trailing edges are independently variable.

5. Apparatus as set forth in claim 4 comprising, in addition, means for generating alternating-current signals the duration of whose positive-going and negative-going excursions are independently variable, and means to apply said signals to said input of said first circuit to gate said first circuit "on" and "off" in response to said excursions of opposite-going polarity, respectively, whereby to control the intervals between said leading and trailing edges in each of said second voltage waveforms and between successive second voltage waveforms.

6. Apparatus for generating a trapezoidal waveform whose rise-time, plateau-time, decay-time and quiescent-time can be independently controlled, said apparatus comprising, in combination, means to provide a square wave whose positive-going and negative-going excursions are independently variable, a linear ramp generator circuit having an input and an output and being adapted to generate a first trapezoidal waveform having a leading edge, a plateau and a trailing edge in response to said excursions of one polarity, said generator circuit also comprising means to adjust said rise-time of said leading edge and means to cause said trailing edge to decay substantially instantaneously, a second circuit having an input and an output, a capacitor, and means connecting said output of said generator circuit to said input of said second circuit, said last-mentioned means connecting said capacitor in common with said input and said output of said second circuit, said second circuit comprising means to charge said capacitor monotonically by said first trapezoidal waveform and adjustable means to discharge said capacitor linearly at a predetermined rate when said first trapezoidal waveform decays at a rate faster than said predetermined rate.

7. Apparatus for generating a variety of electrical waves, said apparatus comprising a first circuit having an input and an output and means to generate a first waveform having substantially linear leading and trailing edges, means to apply a train of alternating voltages to said input to gate said first circuit "on" and "off" in response to the excursions of opposite-going polarities of said alternating voltages, said first circuit also comprising means to adjust independently the rise-time of said leading edge and means to cause said trailing edge to have a substantially instantaneous decay-time, a second circuit having an input and an output, a capacitor, means connecting said output of said first circuit to said input of said second circuit to apply said first waveform to said second circuit, said last-mentioned means connecting said capacitor in common with said input and said output of said second circuit, said second circuit comprising means to charge said capacitor monotonically by said first waveform, and means comprising control means to discharge said capacitor linearly at a predetermined rate whereby to adjust independently said decay-time of said trailing edge of said first waveform and to provide at said output of said second circuit a second waveform whose leading and trailing edges are linear and whose slopes are independently variable.

8. In combination, a bistable flip-flop circuit having two inputs and an output, a pair of delay circuits each connected to a separate one of said inputs of said flip-flop circuit, a linear ramp generator circuit having an input and an output, means connecting said output of said flip-flop circuit to said input of said generator circuit to gate said generator circuit "on" and "off," a second circuit comprising a capacitor, means to connect said second circuit to said output of said linear ramp generator to charge said capacitor monotonically, said second circuit comprising adjustable means to discharge said capacitor at a desired predetermined rate, and output means connected to said capacitor.

9. In combination, means for producing a square wave including means for varying independently the duration of the positive-going and negative-going excursions of said square wave, a linear ramp generator circuit, means connecting said square-wave producing means to said linear ramp generator circuit, said generator circuit comprising means for generating a first voltage waveform having a leading edge, a plateau and a trailing edge, said generator circuit being gated "on" and "off" in response to said excursions of opposite polarities, said generator circuit also comprising means to adjust the slope of said leading edge and means to cause said trailing edge to decay substantially instantaneously, a second circuit, and means to apply said first voltage waveform to said second circuit, said second circuit comprising means to translate said first voltage waveform monotonically, said second circuit also comprising control means to vary linearly the decay-time of said trailing edge and to provide at the output of said second circuit a second voltage waveform whose leading and trailing edges are linear and whose slopes are independently variable, said square-wave producing means comprising means to adjust the duration of said plateau and means to control the frequency of repetition of said second voltage waveform.

References Cited in the file of this patent
UNITED STATES PATENTS 2,515,452     Kaufman _____ July 18, 1950